Jan. 7, 1969  G. A. RIBKEN  3,419,971
TRACING TYPE GAME
Filed Dec. 3, 1965
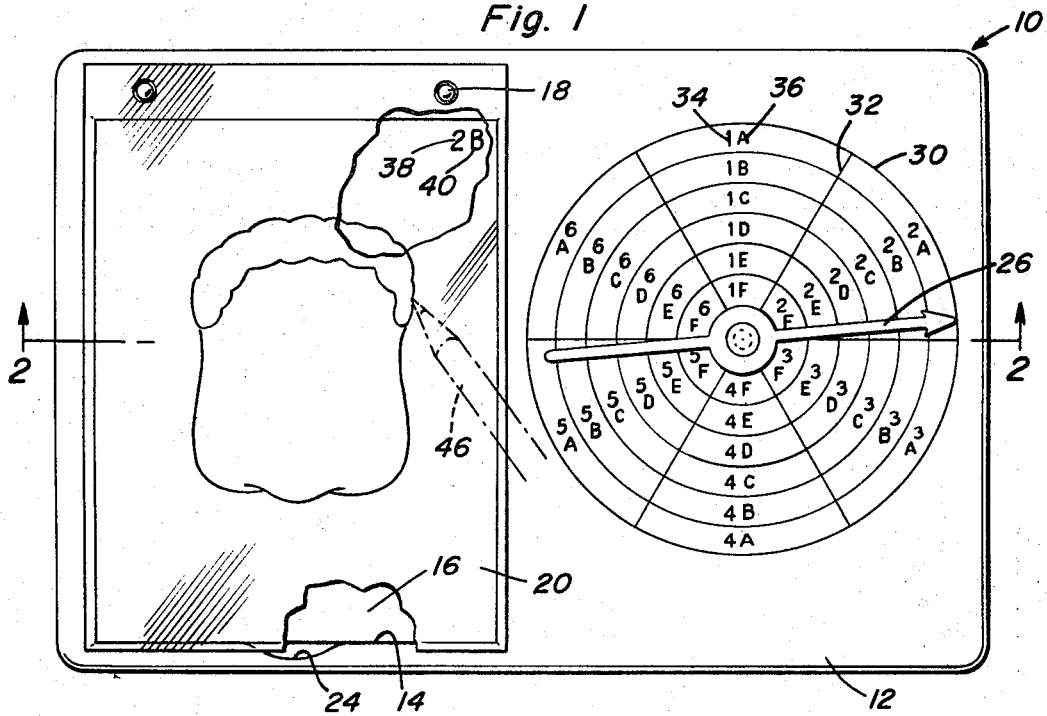
Fig. 1
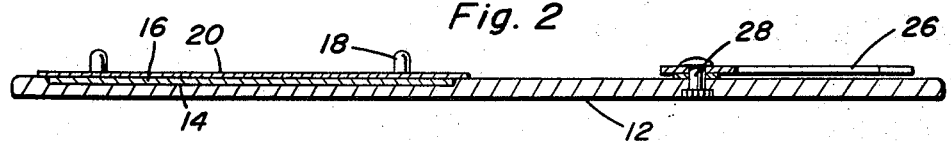
Fig. 2
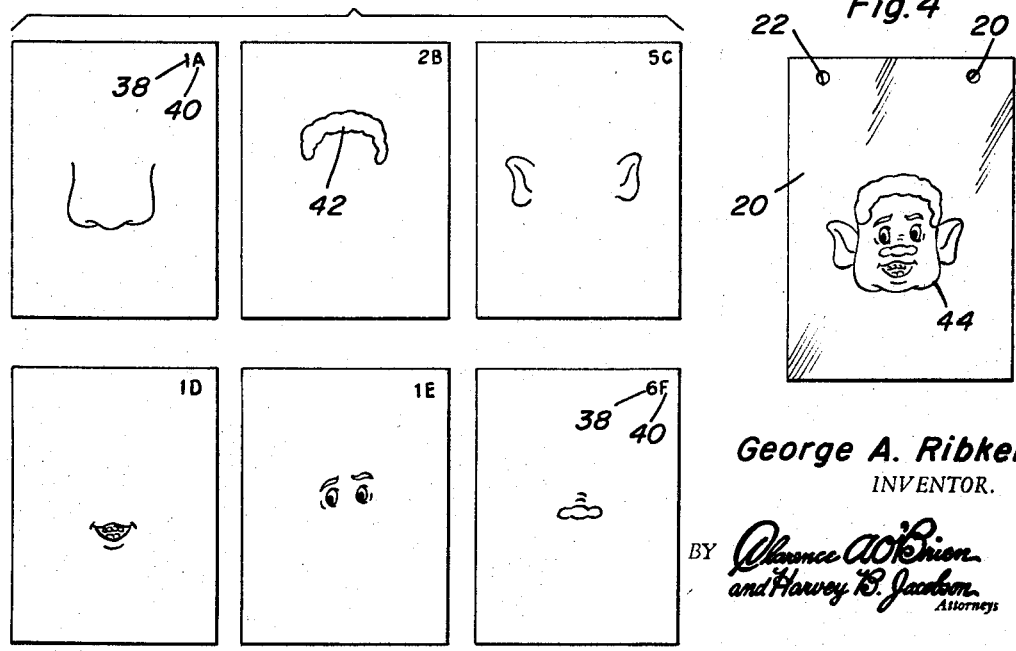
Fig. 3
Fig. 4
George A. Ribken
INVENTOR.

United States Patent Office 3,419,971
Patented Jan. 7, 1969

3,419,971
TRACING TYPE GAME
George A. Ribken, Visalia, Calif.
(2540 N. Miracle Mile, Tucson, Ariz. 85719)
Filed Dec. 3, 1965, Ser. No. 511,461
U.S. Cl. 35—26      3 Claims
Int. Cl. G09b *1/00;* A63f *3/00*

ABSTRACT OF THE DISCLOSURE

A game including a game board with a recess in the upper surface thereof for receiving a plurality of cards and a tracing panel overlying the recess and cards therein. A chance control device in the form of a spinner is provided on the game board for indicating the card to be placed in the recess. Each of the cards is provided with a component of a well-known object with various characteristics being provided on the various cards for enabling a complete object to be formed on the tracing panel from a plurality of the cards.

---

The present invention generally relates to an educational device in the form of a game which is not only entertaining but highly educational in that persons employing the invention will learn the major component parts of a face or body and eventually learn how to compose and draw such components on their own by tracing the components of a face, body or other object thus not only facilitating the teaching of art but at the same time providing a highly entertaining game device which may be chance controlled.

An object of the present invention is to provide a tracing type game or educational device including a plurality of groups of cards with each card having a component of a face, body or other object illustrated thereon together with an assembly on which a selected card may be placed in underlying relation to tracing paper so that the component illustrated on the card may be traced onto the tracing paper. In addition, the cards may be provided with suitable indicia to designate their group and also indicia to designate the particular component illustrated thereon which is used in combination with a chance control device such as a spinner to indicate to a player that a card from a particular group should be selected for use in tracing a component part of the face, body or object.

After a particular card having a component ilustrated thereon has been selected, the component is traced on the tracing paper. The card may be selected by a spinning arrow or other suitable chance device or may be selected at random and each card is used to derive a portion of a face, body or other object and the selecting and tracing procedure is continued until a complete or any part of a face, body or object is drawn on the tracing paper. The device may be effectively employed as a game which has educational values and may be used to draw faces, bodies or objects of all kinds. The combination of identifying letters and numbers may be varied as may the chance device for selecting the individual cards. For example, numbers, letters, words, symbols or the like may be employed for identifying the cards and the cards may have different features of faces, bodies and the like such as shapes of heads, hair, eyes, ears, noses, mouths, bodies, legs, arms, hands and feet. Also, the cards may have distinguishable colors thereon for identification purposes and also to indicate a particular color of a component. For example, the component illustrating the hair may be colored a particular color to illustrate the color which the hair component of the face should be colored.

Another object of the present invention is to provide a tracing type of game device or educational device which is simple in construction, easy to use, relatively inexpensive to manufacture and effective in teaching children art work and at the same time entertaining them.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the device of the present invention illustrating portions of the tracing paper broken away to ilustrate a card underlying the tracing paper;

FIGURE 2 is a longitudinal, sectional view taken substantially upon a plane passing along section line 2—2 of FIGURE 1 illustrating the structural details of the device;

FIGURE 3 is a plan view of a group of cards illustrating representative components illustrated on the individual cards; and FIGURE 4 is a plan view of a completed face on the tracing paper.

Referring now specifically to the drawings, the numeral 10 generally designates the game device of the present invention which is also used as an educational device and which includes a game board 12 of generally rectangular configuration and constructed of wood, heavy cardboard or other similar material and having a substantially planar face.

Adjacent one side edge of the game board 12 and extending substantially from the top to bottom edge thereof is a recess 14 communicating with the upper surface thereof for closely fitting and receiving one of a plurality of cards 16 so that when the card 16 is placed in the recess 14, the upper surface of the card will be substantially flush and coextensive with the upper surface of the game board 12 as ilustrated in FIGURE 2. At the upper edge of the recess as viewed in FIGURE 1, the game board 12 is provided with a pair of upstanding pins or pegs 18 which serve to position and locate a sheet of tracing paper 20 thereon having apertures 22 for positioning over the pegs 18. Thus, this enables the tracing paper 20 to be temporarily removed when desired and replaced in the same position in view of the fact that the pegs 18 are closely received in the openings 24.

To facilitate removal and placement of the card 16 in the recess 14, the edge of the recess opposite from the pegs 18 is provided with a notch 24 which serves as a finger opening for inserting the finger under the edge of the card 16 so that the card may be lifted up and removed from the recess 14 and also so that it can be more expeditiously placed in position therein.

Disposed on the game board 12 alongside of the recess 14 is a rotatable indicator in the form of an arrow 26 mounted for rotation by a centrally disposed rivet 28 or other suitable fastener so that the arrow 26 may spin about a vertical axis as illustrated in FIGURE 1. The arrow 26 overlies a plurality of concentric lines 30 having their center coincident with the center of rotation of the arrow with the concentric lines being divided into six quadrants or sectors by diametrically extending lines 32. Each of the quadrants are identified by numerical indicia 34 and each of the radial segments between the concentric lines are identified by alphabetical letters 36 although indicia could be employed to identify the different segments. When the arrow 26 stops in overlying relation to a particular quadrant, the player may use any of the indicia disposed in that quadrant.

The cards 16 are arranged in six groups as illustrated in FIGURE 3 with the individual groups being identified by the alphabetical indicia 40 which is the same as the alphabetical indicia 36 in the radial segments underlying the arrow 26. The individual cards in each group are identified by numerical indicia 38 which is the same as the numerical indicia 34 in the quadrants underlying the arrow. Thus when the arrow is orientated starting with the first spin of arrow 26, the alphabetical letter A and whatever numerical quadrant the arrow stops on is used. Example: First spin would be the radial segment A and whichever numerical quadrant arrow stops on 1 through 6 is used. Second spin would be the radial segment B and whichever numerical quadrant arrow stops on 1 through 6 is used. Since the alphabetical letter indicates which group of cards to be used, and the numerical indicia indicates which card of that particular alphabetical group is to be used. Each card in the group B will have a hair arrangement illustrated thereon with the hair arrangement being defined by indicia 42. The other groups of cards will have other elements or components of a face, body or other objects illustrated thereon. As illustrated, the first group of cards has the face and chin outlined thereon, the second group of cards has hair arrangements illustrated thereon, the third group has ears illustrated thereon and by selecting the individual cards from the groups as indicated by the spinning arrow 26, a composite face 44 may be traced onto the tracing paper 20 by employing a suitable marking implement such as a pencil 46 or the like. The cards 16 may be easily changed by either lifting the bottom edge of the tracing paper up or completely removing the tracing paper if desired. Also, more or less than six quadrants or segments and more or less than six groups or six cards in each group may be employed depending on the work of art to be traced.

The cards may be conveniently made of cardboard or other similar material and the tracing paper may be of conventional material or may be of transparent plastic having a surface which can be easily cleaned by wiping with a damp cloth or the like.

While the cards have been illustrated with component parts of a face or head illustrated thereon, it is pointed out that other body components may be illustrated such as arms, legs, torsos and the like. Further, component parts of other well-known objects may be illustrated on the cards so that children using the game device may learn the shapes and configurations of the component parts of various objects other than a face or head. The component parts may be conical in configuration, grotesque or normal and may be effectively used to teach children art work by enabling them to trace various components of a known object so that after use of the game device, they subsequently will be able to draw the components without tracing over the card thereby effectively teaching them basic skills in art work.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A device for aiding in the teaching of art work and at the same time providing a game device comprising a game board having a substantially planar upper surface and provided with a recess in said surface, a plurality of cards for selective disposition in the recess whereby the upper surface of a card disposed in the recess will be substantially flush with the planar surface of the game board, a pair of spaced pegs disposed adjacent said recess, a panel of tracing material having apertures therein positioned on said pegs in completely overlying relation to the recess and a card disposed therein so that tracings may be made from the card onto the tracing panel, each of said cards having a component of a well-known object illustrated thereon so that such component may be traced onto the tracing panel, said cards being separated into groups with each group having the same component illustrated thereon but having different characteristics, and chance control means mounted on said game board for indicating the groups of cards from which a component is to be selected.

2. The structure as defined in claim 1 wherein said chance control means includes an indicating arrow rotatably mounted on said game board adjacent the recess, a plurality of concentric circles underlying the arrow, said concentric circles being divided into sectors by a plurality of diametric lines thereby enabling the different sectors to be indicated by a spin of the arrow.

3. The structure as defined in claim 2 wherein each area defined by the concentric circles and diametric lines being designated by numerical and alphabetical indicia, said cards being provided with corresponding numerical and alphabetical indicia in one corner thereof for enabling the particular card designated by the arrow to be selected from a group of cards and placed in the recess, one edge of said recess being provided with a notch therein to facilitate insertion of the finger under the tracing panel and card therein for ease of removal and insertion of the card.

References Cited

UNITED STATES PATENTS

| | | |
|---|---|---|
| 609,347 | 8/1898 | Von Holzhausen. |
| 1,328,368 | 1/1920 | Cotoli. |
| 1,540,288 | 6/1925 | Schallis. |
| 1,552,406 | 9/1925 | Akerbladh _____ 35—26 |
| 2,717,156 | 9/1955 | Nelson _____ 273—134 |
| 2,974,426 | 3/1961 | McDonald _____ 35—26 |
| 3,055,662 | 9/1962 | Kemp _____ 273—85 |

EUGENE R. CAPOZIO, *Primary Examiner.*

H. S. SKOGQUIST, *Assistant Examiner.*

U.S. Cl. X.R.

273—135